United States Patent

[11] 3,623,034

[72] Inventors Peter Istvan Bonyhard
Newark;
Irynej Danylchuk, Morris Plains, both of N.J.

[21] Appl. No. 38,124
[22] Filed May 18, 1970
[45] Patented Nov. 23, 1971

[73] Assignee Bell Telephone Laboratories, Incorporated
Murray Hill, N.J.

[54] SINGLE WALL DOMAIN FAST TRANSFER CIRCUIT
6 Claims, 16 Drawing Figs.

[52] U.S. Cl. .......... 340/174 TF
[51] Int. Cl. .......... G11c 19/00, G11c 11/14, G11c 7/00
[50] Field of Search .......... 340/174 TF

[56] References Cited

UNITED STATES PATENTS

| | | | |
|---|---|---|---|
| 3,534,347 | 10/1970 | Bobeck .......... | 340/174 TF |
| 3,540,021 | 11/1970 | Bobeck et al. .......... | 340/174 TF |
| 3,541,535 | 11/1970 | Perneski .......... | 340/174 TF |

*Primary Examiner*—Stanley M. Urynowicz, Jr.
*Attorneys*—R. J. Guenther and Kenneth B. Hamlin

ABSTRACT: A fast transfer circuit for single wall domains is described. The circuit comprises a succession of recirculating positions defined by magnetically soft overlays. It all the recirculating positions are occupied by domains, any subsequent information introduced to the beginning of the sequence appears at the end of the sequence more quickly than a domain otherwise moves in a normal propagation mode employing overlays. Movement of domains is in response to a rotating in-plane field which changes the positions of domain-attracting poles in the overlay.

INVENTORS P.I. BONYHARD
I. DANYLCHUK
BY Herbert M. Shapiro
ATTORNEY

SINGLE WALL DOMAIN FAST TRANSFER CIRCUIT

FIELD OF THE INVENTION

This invention relates to magnetic memory arrangements and, more particularly, to such arrangements in which patterns of single wall domains representative of information are moved in a medium.

BACKGROUND OF THE INVENTION

A single wall domain is a magnetic domain encompassed by a single domain wall which closes on itself in the plane of the medium in which it moves. Such a domain is a stable, self-contained entity free to move anywhere in the plane of the medium in response to offset attracting magnetic fields.

Magnetic fields are often provided in such arrangements by an array of conductors pulsed individually by external drivers. The shape of the conductors is dictated by the shape of the domain and by the material parameters. Most materials suitable for the movement of single wall domains exhibit a preferred direction of magnetization normal to the plane of movement and, for all practical purposes, are magnetically isotropic in the plane. Conductors suitable for domain movement in such materials are shaped as conductor loops providing magnetic fields in first and second directions along an axis also normal to the plane. By pulsing a succession of conductors of the array consecutively offset from the position of a domain, domain movement is realized. In practice, the conductors are interconnected serially in three sets to provide a familiar three-phase shift register operation. The use of single wall domains in this manner is disclosed in U.S. Pat. No. 3,460,116 of A. H. Bobeck, U. F. Gianola, R. C. Sherwood and W. Shockley, issued Aug. 5, 1969.

The mobility of domains in various materials is a function of the material parameters and the magnitude of the applied field. The mobility determines the time required for a domain to move from one bit location to the next, i.e., the bit rate. Megacycle bit rates have been observed in some rare earth orthoferrites. Although megacycle bit rates are entirely acceptable for many electronic applications, higher bit rates are desirable in some instances. Also, in some arrangements, for example, different functions may be implemented in spaced apart regions in a single sheet of magnetic material. Frequently, interconnection between the regions may be desirably faster than the intrinsic mobility permits or at least relatively fast compared to other operations occurring simultaneously within the material. When domain propagation is realized by a pulsed conductor array where, within practical limits, increased pulse magnitudes enable increased bit rates, the realization of different bit rates is not a significant problem. But, such conductor arrays are not easily made in the minute dimensions required to move, for example, micron-size domains.

An alternative propagation technique involving the generation of reorienting magnetic fields in the plane of movement of domains, on the other hand, is particularly well suited for propagating small size domains. But there is no simple implementation compatible with this technique for achieving different bit rates in different regions of the plane of movement. Such a technique, for example, typically employs an overlay of magnetically soft spatially distributed elements disposed to respond to a reorienting in-plane field to generate changing magnetic pole patterns which attract domains simultaneously to consecutive positions in a propagation channel. One specific arrangement of this type comprises a repetitive bar and T-shaped overlay pattern which defines a propagation channel along which domain patterns move the distance of one repeat of the pattern in response to each cycle of a rotating in-plane field. Such an arrangement is described in copending application Ser. No. 732,705, filed May 28, 1968 now Pat. No. 3,534,347 for A. H. Bobeck.

One object of this invention is to provide a domain propagation overlay arrangement which permits the presence or absence of a domain to be advanced different numbers of repeats of the overlay pattern in response to a single cycle of an in-plane field.

BRIEF DESCRIPTION OF THE INVENTION

This invention is based on an adaptation of the counter arrangement of copending application Ser. No. 795,148, filed Jan. 30, 1969 now Pat. No. 3,577,131 for R. H. Morrow and A. J. Perneski. That counter arrangement requires a sequence of positions at each of which a single wall domain is recirculated in response to a rotating in-plane field. A magnetically soft overlay is patterned to permit a specified domain to leave a recirculating position of the sequence, once all the positions of the sequence are filled, only when another domain passing in an auxiliary channel is positioned to deny a next recirculating position to that specified domain. It is important in these counter arrangements that the overlay be designed to inhibit passage of domains through the entire sequence of recirculating positions. This is usually accomplished by defining a terminal (dummy) recirculating position which is always occupied by a domain for providing a "back pressure" on other recirculating domains.

In the present arrangement, passage of domains through a sequence of recirculating channels is desired. It has been found that a domain introduced to such a sequence passes the information represented by the presence and absence of that domain to the end of the channel in a single rotation of the in-plane field. The operation has been observed through a microscope using the familiar Faraday effect and is detected electrically with Hall effect type devices.

DETAILED DESCRIPTION

Figure 1:
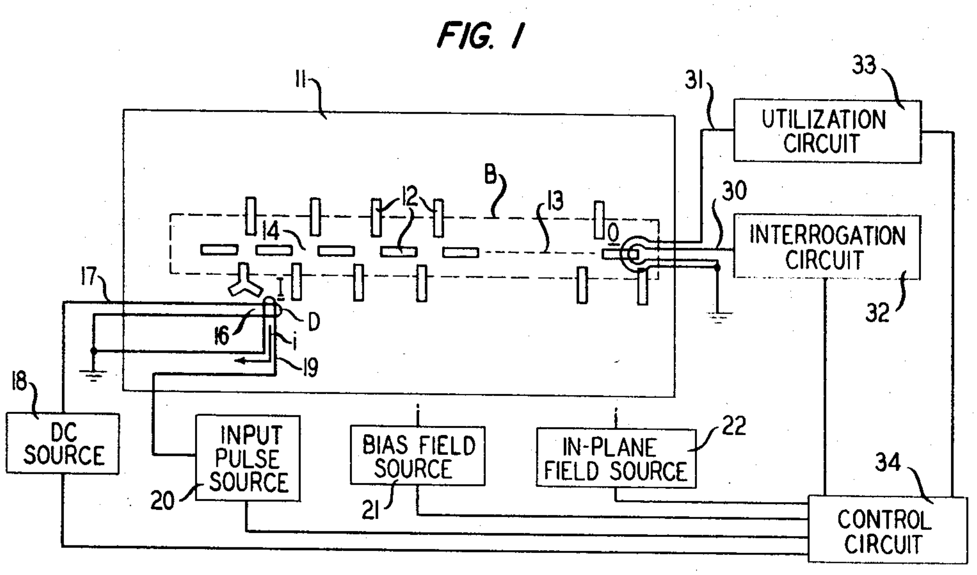
FIG. 1 is a schematic illustration of a domain propagation device in accordance with this invention.

FIG. 1 shows a domain propagation arrangement in accordance with this invention. The arrangement comprises a sheet 11 of material in which single wall domains can be moved.

Bar-shaped overlay elements 12 define a propagation channel 13 comprising a sequence of "idler" or recirculating positions 14 disposed between input and output positions I and O. The overlays are conveniently deposited on a glass substrate and juxtaposed with the surface of sheet 11 or, alternatively, deposited on the surface of sheet 11 in either instance by well-known vacuum deposition and photoetching techniques. In the latter instance, deposition of the overlay preferably occurs over a chromium spacing layer of a thickness (about 1,000 A) to avoid exchange coupling between the overlay and the magnetic sheet.

The organization of the overlay and the functions implemented thereby will be understood most simply by a description of the generation and the disposition of domains with respect to the overlay as an in-plane field is reoriented in (the plane of ) sheet 11. It is convenient, in this connection, to represent as plus signs the attracting magnetic poles generated in the overlay by the in-plane field. It is to be understood, however, that for an assumed convention in which a domain having its magnetization is directed out of sheet 11 as viewed in FIG. 1, positive poles attract domains if the overlay is on the bottom surface of sheet 11 as viewed in FIG. 1 and negative poles attract if the overlay is on the top surface. To avoid confusion, a domain is represented only as a circle. The plus sign represents the attracting pole concentrations.

The input position of FIG. 1 comprises a region 16 of positive magnetization for the convention assumed. Region 16 is separated from the remainder of sheet 11 by a domain wall coincident with a conductor 17. Conductor 17 is connected between a DC source 18 and ground and serves to maintain stable the geometry of region 16. A hairpin-shaped conductor 19 overlaps region 16 in a manner to separate a region D therefrom when a positive pulse is applied to it as indicated by the arrow *i* in the figure. Conductor 19 is connected between an input pulse source 20 and ground.

The region D so generated becomes a single wall domain, also designated D hereinafter, having a diameter determined, for any given sheet, by a bias field of a polarity to contract domains. The bias field is generated by any well-known means represented by block 21 of FIG. 1 and may comprise, for example, a coil encompassing sheet 11 and oriented in the plane of the sheet or, alternatively, a permanent magnet.

An alternative domain input responsive to reorienting in-plane fields in absence absence of electrical conductors is described in copending application Ser. No. 756,210, filed Aug. 29, 1968 now Pat. No. 3,555,527 for A. J. Perneski.

Figure 2:
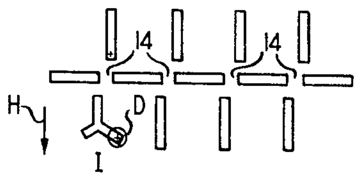
FIGS. 2–14 are schematic illustrations of representative portions of overlays useful in the arrangement of FIG. 1 showing consecutive magnetic conditions therein and the associated in-plane field orientations for effecting such conditions.
Figure 3:
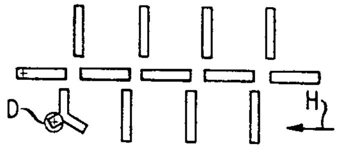
Figure 4:
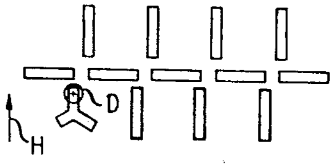
Figure 5:
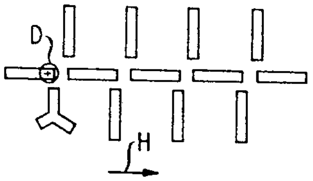
Figure 6:
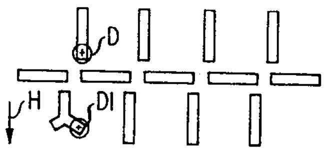

A domain (D of FIG. 2) so generated at I is advanced by the changing pole patterns, in response to the reorienting in-plane field, into the area encompassed by broken block B of FIG. 1. Specifically, a magnetic field in the plane of sheet 11 is provided and reoriented by a source represented by block 22 of FIG. 1. The source may comprise, for example, two pairs of spaced apart coils each pair including coils parallel to one another, mutually perpendicular, and disposed orthogonally with respect to sheet 11 to provide the requisite fields as will be indicated hereinafter. The coils are pulsed, or sinusoidally driven, in pairs to ensure substantially uniform fields in sheet 11. When the coils are pulsed, for example, in sequence first with a pulse of one polarity, then of the opposite polarity, an appropriate sequence of angularly displaced (rotated) fields is generated.

The overlay elements are disposed illustratively with respect to one another to respond to a field rotating in the plane of sheet 11 to generate consecutively displaced attracting poles for moving domains. The pertinent attracting poles for a given domain are generated, for consecutive orientations of the field, along the overlays consecutively offset from the position occupied by that domain and having long dimensions paralleled to the field for each orientation. The in-plane field is assumed to rotate clockwise as illustrated by the sequence of orientations shown for arrow H in FIGS. 2 through 6. For such a field, the overlay will be seen to define a sequence of recirculating positions 14 along which a sequence of domains moves only so long as the sequence includes a sufficient number of domains to occupy all the recirculating positions subsequent to that occupied by the first of the sequence. In the absence of such subsequent domains, the first domain (D) merely recirculates in one of the recirculating positions instead of passing along the sequence as is now discussed in detail.

Figure 11:
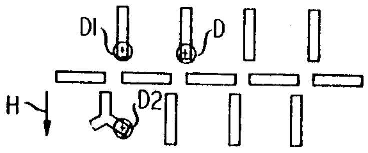

Assuming the presence of subsequent domains, domain D is advanced one position (viz, the distance of one repeat of the overlay pattern) in response to one complete cycle of the in-plane field (see FIG. 2–5). During each cycle one domain is introduced at I and moved in like fashion. FIGS. 7 through 11 show the consecutive positions for domain D and a subsequent domain D1 during the next cycle of the in-plane field. A third domain D2 is introduced as shown in FIG. 11. Normal operation in accordance with this invention is achieved when all the recirculating positions are occupied by domains in this manner.

A glance at FIG. 1 indicates that an entire propagation channel in accordance with this invention comprises a sequence of what we have termed idler or recirculating positions. Each idler comprises a set of consecutive domain positions shown occupied by domain D in FIGS. 4 through 7. Domain D1 occupies the same sequence of positions as indicated in FIGS. 8 through 11.

Figure 7:
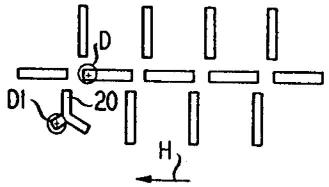
Figure 8:
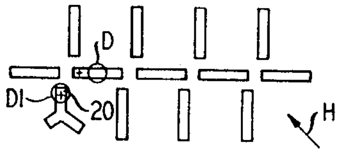
Figure 9:
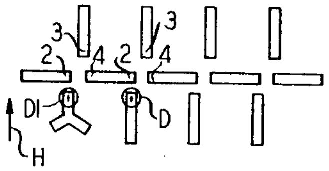
Figure 10:
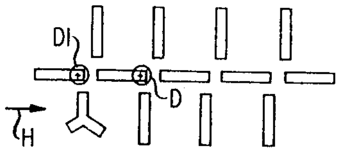

It is perhaps appropriate to examine FIGS. 7 and 8 to note the different positions of (a representative) domain D when a next consecutive domain D1 denies domain D access to a preferred position 20. It is this domain interaction which permits a domain to recirculate in the absence of a subsequent domain and to advance when a subsequent domain is present. In the absence of additional domains, domains D and D1 continue to recirculate from the ones shown occupied thereby in FIG. 9 through the positions 2, 3, and 4 shown for each there. If the entire channel as shown in FIG. 1 comprises, illustratively, 10 recirculating positions, the stable state condition for the channel in accordance with this invention includes 10 domains occupying those positions and recirculating therein as do domains D and D1 in FIG. 9 in response to a reorienting in-plane field.

Figure 12:
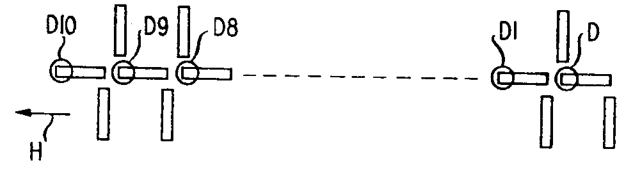
Figure 13:
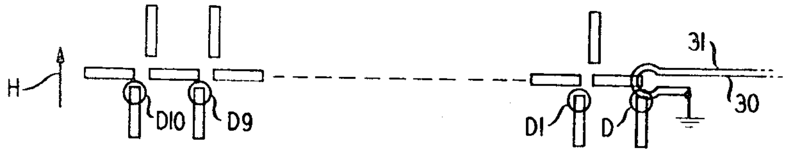
Figure 14:
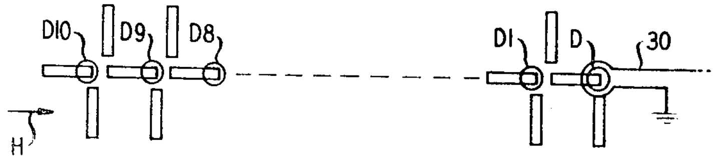

Now consider the operation when all the recirculating positions are occupied and an additional domain D10 is introduced and advanced to the position, previously occupied by domain D in FIG. 7, as shown in FIG. 12. One-half rotation later, the information (not domain D10 itself) represented by domain D10 is detected as the presence of domain D at the terminal position of the channel coupled by conductors 30 and 31 as shown in FIGS. 13 and 14. The transmission of the information along the channel is attributed to an interaction of the type shown in FIG. 8 in each recirculating position in the channel as the in-plane field reorients from the direction indicated by arrow H in FIG. 12 to that indicted by the arrow in FIG. 13.

Detection is carried out illustratively by interrogating the terminal position for the presence of a domain during what might be designated a second phase of the in-plane field cycle (input occurs illustratively in a third phase) as represented by the orientation of arrow H in FIG. 14. The interrogation operation may comprise an appropriate pulse applied to conductor 30 to (conveniently first enlarge and then) collapse any domain occupying the position. Conductor 31 has a pulse induced in it if a domain were present in the terminal position. Conductors 30 and 31 are connected between an interrogation circuit 32 and a utilization circuit 33, respectively, and ground, as shown in FIG. 1.

Circuits 30 and 31 as well as sources 18, 20, 21, and 22 are connected to a control circuit 34 for synchronization and activation. The various sources and circuits may be any such elements capable of operating in accordance with this invention.

We have now demonstrated that a domain D10 which may be taken as representative of a binary "one" passes the information it represents to the output of the channel in one cycle of the in-plane field. This is to be compared with the advance of information one repeat length for the familiar overlay domain propagation arrangement in response to one cycle of the in-plane field. In the illustrative arrangement, the information is shown advanced 10 stages in a single cycle. Of course, if the channel were 100 stages long, the information would have advanced 100 stages in that cycle.

The illustrative operation assumed the presence of a domain D10 representing a binary one. If such a domain were absent, a binary zero would have been detected as the absence of a domain when the terminal position was interrogated three phases later.

The utility of the "fast transfer" circuit of FIG. 1 may be appreciated fully when considered in the context of a multifunction sheet where specified functional regions in a sheet of orthoferrite or garnet material are designed to perform different functions and are interconnected by such fast transfer circuits. One suitable multifunction arrangement is disclosed in copending application Ser. No. 657,877, filed Aug. 2, 1967, now Pat. No. 3,541,522 for A. H. Bobeck, H. E. D. Scovil, and W. Shockley. Another particularly useful arrangement is a crossover array familiar in a telephone central office. One such crossover arrangement employing single wall domain channels which intersect at a recirculating position (viz, 14 of FIG. 1) is disclosed in copending application Ser. No. 834,350, filed June 18, 1969 now Pat. No. 3,543,255 for R. H. Morrow and A. J. Perneski.

Figure 16:
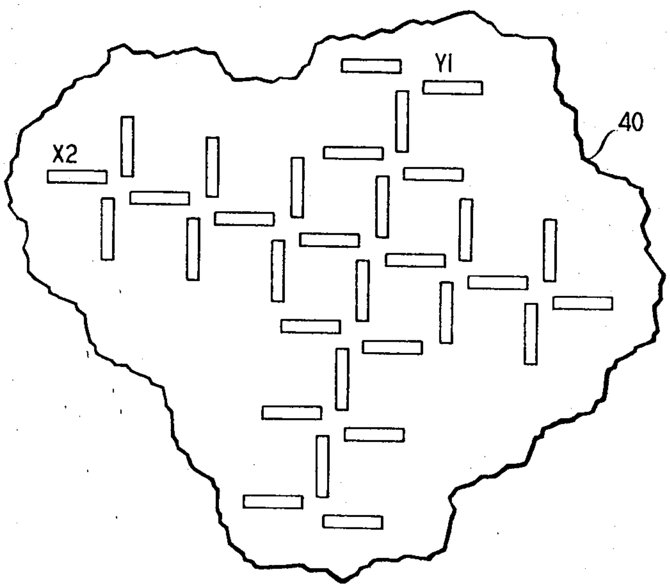
FIGS. 15 and 16 are schematic illustrations of an alternative arrangement in accordance with this invention.
Figure 15:
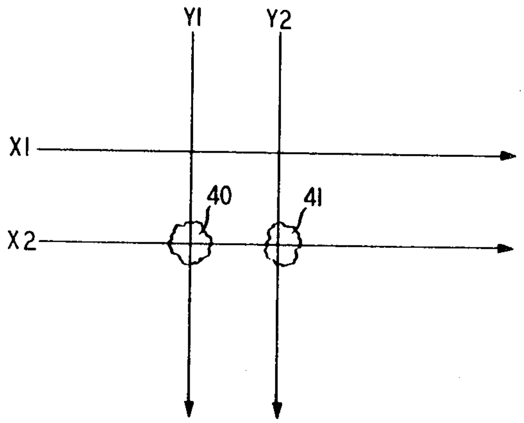

FIG. 15 shows a line diagram of a crossover arrangement in its most simple form. The cited Morrow-Perneski application demonstrates that information moving downward along a Y channel, say channel Y1 of FIG. 15, will pass intersection 40 without interference with information moving to the right in an X channel, say channel X2 of FIG. 15. The crossover employing a fast transfer circuit in accordance with this invention works in an entirely analogous manner to provide a planar crossover matrix. It is to be understood that regardless of the length of the transmission path through the matrix, transmission is complete in one cycle of the in-plane field when fast transfer circuits are employed. The details of an intersection of an X and Y channel designated either 40 or 41 in FIG. 15 are shown in FIG. 16.

Fast transfer circuits of the type shown in FIG. 1 have been operated with platelets of samarium terbium orthoferrite. The overlay geometry was 5×1 mils with 8 mil repeats for moving 2.0 mil domains. The in-plane field was 12 oersteds and the bias field was 50 oersteds. A domain moves completely through, for example, a 10 stage channel in a single cycle of a 100 kilocycle in-plane field.

What has been described is considered only illustrative of the principles of this invention. Therefore, various other arrangements may be devised by one skilled in the art without departing from the spirit and scope of this invention.

What is claimed is:

1. A magnetic domain propagation arrangement comprising a magnetic material in which single wall domains can be moved, space distributed means for altering the positions of domains in a first propagation channel synchronously, said space distributed means defining a sequence of $n$ positions each in a manner to recirculate a first domain in the absence of a subsequent domain and to move said first domain to a next consecutive one of said $n$ positions in the presence of said subsequent domain, and output means coupled to a terminal one of said $n$ positions for detecting the presence of a domain there when an $n+1$th domain is introduced to said channel.

2. An arrangement in accordance with claim 1 wherein said space distributed means comprises spatially distributed magnetically soft elements on a surface of said magnetic material and means for providing a reorienting in-plane field for changing domain-attracting pole patterns in said elements.

3. An arrangement in accordance with claim 2 including means for introducing single wall domains to a first of said sequence of positions and means for detecting the presence or absence of domains at a terminal one of said positions.

4. An arrangement in accordance with claim 2 including a second propagation channel intersecting said first and having in common with said first channel one of said $n$ positions.

5. An arrangement in accordance with claim 4 wherein a single wall domain occupies each of said $n$ positions.

6. A single wall domain propagation circuit comprising a sheet of magnetic material in which single wall domains can be moved, a magnetically soft overlay adjacent said material for defining a propagation channel between input and output positions for single wall domains, said overlay having a geometry for generating changing magnetic pole patterns in response to a magnetic field reorienting in the plane of said sheet for advancing a sequence of single wall domains in said channel, said overlay including elements arranged to generate recirculating pole patterns for recirculating a domain at each of a plurality of prescribed positions in said channel in the absence of a subsequent domain, each of said prescribed positions being sufficiently close to a next succeeding one of said positions so that a domain recirculating in each influences the position of a domain in said next succeeding position causing the latter domain to advance in said channel, means for providing a domain in each of said prescribed positions, means responsive to an input signal for introducing a domain at said input positions when each of said prescribed positions includes a domain, and means for detecting domains at said output position.

* * * * *